Nov. 19, 1968  G. E. MOERLINI ET AL  3,411,431
DEVICE FOR PREPARING A BEVERAGE, IN PARTICULAR COFFEE
Filed Sept. 20, 1966  2 Sheets-Sheet 1

Nov. 19, 1968    G. E. MOERLINI ETAL    3,411,431
DEVICE FOR PREPARING A BEVERAGE, IN PARTICULAR COFFEE
Filed Sept. 20, 1966    2 Sheets-Sheet 2

United States Patent Office 3,411,431
Patented Nov. 19, 1968

3,411,431
DEVICE FOR PREPARING A BEVERAGE, IN PARTICULAR COFFEE
Gilbert Eric Moerlini and Renato Moerlini, both of Peseux, Switzerland
Filed Sept. 20, 1966, Ser. No. 580,735
Claims priority, application Switzerland, Sept. 21, 1965, 13,059/65
6 Claims. (Cl. 99—304)

ABSTRACT OF THE DISCLOSURE

The device according to the present invention is characterized in that it comprises a body having two wings designed to rest on the rim of a utensil and having a hollow portion forming a measuring container and containing a determined quantity of ground coffee or designed to receive a bag of ground coffee tightly enclosed in said hollow portion.

Background of the invention

The sacs intended for the preparation of infusions and containing the goods to be infused are well known, for instance, the tea sacs or bags. Such bags, which are placed in a utensil and onto which is poured hot water, are not suitable for the preparation of coffee, inasmuch as it is necessary for the hot water to percolate through the ground coffee in order to produce a good coffee. It is with a view to removing this inconvenience that the manufacturers have placed on the market the soluble coffee in powder form. Although the latter presents great advantages, such as instantaneous preparation, elimination of coffee pot cleaning, and the like, this solution has not met with the approval of the lovers of good coffee.

Moreover, devices have been proposed for preparing coffee, commonly referred to as coffee filters, in which the goods to be infused, in the circumstances ground coffee, is enclosed between the perforated bottom of a utensil and an interchangeable strainer retaining the coffee powder, with the utensil positioned upon a receptacle, a glass in this particular case, into which the water is allowed to run upon passing through the coffee.

These known devices are hardly serviceable inasmuch as they are comprised of movable elements which require careful cleaning after each use. Besides, where the user introduces a too small amount of coffee, the beverage so obtained will be too limpid and without flavour because of the tendency of the water passing therethrough to displace the coffee towards the rim of said utensil. Where, on the other hand, the user introduces an excessive measurement of ground coffee, the latter is not allowed to dilate; it is compressed and forms a plug through which the water seeps too slowly. The coffee is not hot and, moreover, contracts a bitter taste, hampers digestion instead of activating it, because of its too high content of tannin.

Description

The present invention is concerned with a device to be seated on the rim of an open top container for preparing a beverage, in particular coffee.

The object of the present invention is to eliminate the shortcomings outlined above for known devices and to provide a device for preparing a beverage, in particular coffee, which is simple, requires no cleaning after use because it can be disposed of, and which permits to obtain quickly and inexpensively a cup of excellent coffee, and can be used at any time, especially in offices.

The attached drawing represents, by way of example, an embodiment of the device, subject matter of the invention.

Figure 1:
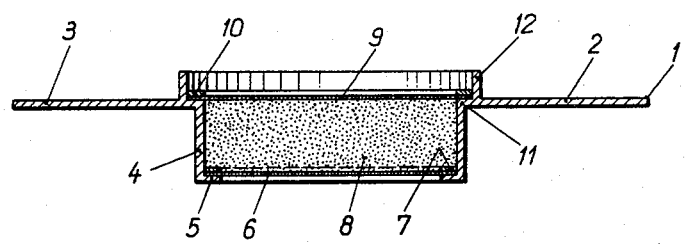
Figure 2:
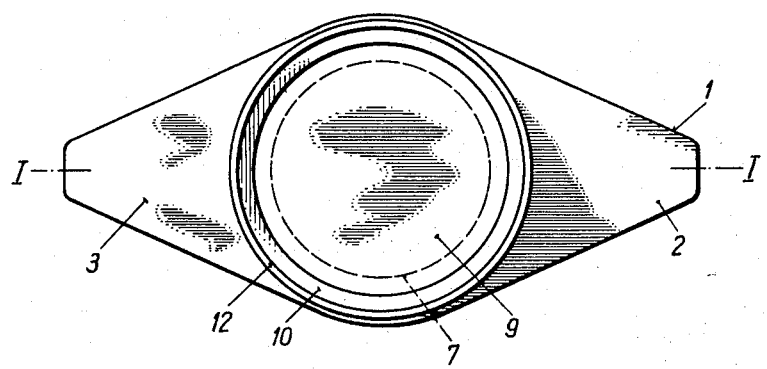
Figure 3:
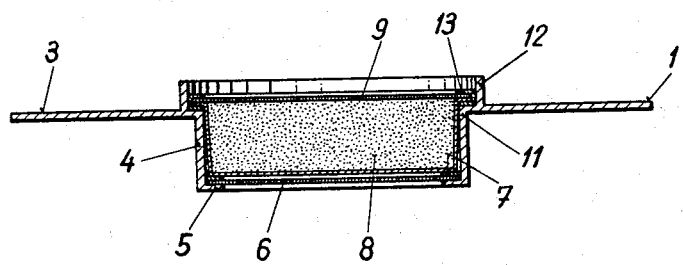

FIG. 1 shows a section on line I—I of FIG. 2;
FIG. 2 shows a plan view of said device;
FIG. 3 is a view corresponding to FIG. 1, but including a bag for the coffee; and
FIG. 4 is a cross-sectional view of the bag and retaining rings of FIG. 3.

The device for preparing a beverage, in particular coffee, and as shown in FIGURES 1 and 2 comprises a body 1 obtained by injection of a synthetic material which does not change the flavour of coffee, such as polystyrene, or by stamping a sufficiently rigid aluminum sheet. The body 1 includes two diametrically opposite wings 2, 3 designed to rest on the rim of a utensil, such as a cup or glass. The body 1 centrally carries a hollow portion 4 which extends downwardly in the shape of a slightly truncated cone and has a depth determined in such a manner that the amount of ground coffee received therein corresponds to the measurement necessary for preparing a cup of coffee. The open bottom of the hollow portion 4 includes an inwardly turned flange 5 which is adapted to retain by means of the edges thereof a disk 6 of porous material, such as filter paper, allowing only liquid coffee to pass therethrough and retaining the used coffee grounds. The disk 6 is held therein by a ring 7 placed in position by stamping after positioning of disk 6. The cavity formed by the hollow portion 4 and closed by disk 6 is then filled with ground coffee 8 which, in turn, is covered by a disk 9 similar to disk 6 but having a larger diameter, which disk 9 is secured in position by a ring 10 seated on a brim 11 of body 1 and stamped between the walls of a flange 12 extending perpendicularly upwardly in relation to said brim and preventing the water from flowing outside of the surface of disk 9 and from running into the cup or glass without passing through the ground coffee. As a rule, the rings 7 and 10 are made from the same material as body 1, said material being selected so that it will not alter the aroma of the coffee.

Figure 4:
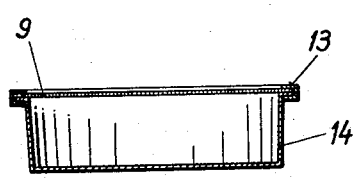

Instead of disposing the measurement of ground coffee directly between the two disks 6 and 9 and placing it into position by the wholesaler, it would also be possible to use a portion of ground coffee packed in a bag 14, FIGS. 3 and 4, made from porous material, this bag being inserted, when in use, into the hollow portion 4 of body 1, with FIG. 3, the hollow portion resting on the flange 5 and held in position by a disk 13 similar to disk 10, superimposed on a disc 9 or by a split elastic disk and having a strip for easy withdrawal thereof. This arrangement permits placing on the market an assortment comprised of a single body 1 and a determined number of bags of ground coffee.

For brewing a coffee using such a bag it suffices to place the body 1 on a cup or glass, to introduce the coffee bag 14 into the hollow portion 4, to place into position the discs 9 and 13 and to pour hot water on said bag. The bag is then withdrawn by means of its strip and the used bag is thrown off; the body 1 is thus reusable.

In a preferred modification of the described embodiment the coffee could be placed into a small bag of porous material open at its upper end, with the bottom of said small bag advantageously replacing the disk 6 and resting against the bottom of body 1 made from the same material as said body and having holes pierced therein. Also, in this modification, the disk 9 of porous material could be replaced by a very fine-meshed network, e.g., a network of synthetic material, such as nylon.

By way be another modification, the rings 7 and 10 could be made either from aluminum or from a strong cardboard wrapped in an aluminum foil having grooves set therein, or else from a glazed board which does not expand when exposed to humidity. The disks 6 and 9 of porous material could then be directly secured to said rings.

The hollow portion 4 could also be given such dimensions as would make it suitable for containing greater measurements of ground coffee to permit preparing a greater amount of coffee, for instance two or three cups.

Finally, there could be provided the devices described with reference to FIGURES 1 and 2, each vacuum packed in a thin aluminum foil so that they can be stored by the traders as well as by the consumers and so that the ground coffee does not fall off in its strength nor in its aroma. As to the coffee itself, one may use normal coffee or decaffeinated coffee, and the body 1 may be differently colored to identify the kind of coffee it contains. The bags of ground coffee wrapped in their sheets of porous material could also be vacuum packed in a thin aluminum foil for the same reasons as set out above.

Obviously, may modifications and equivalents of the invention hereinbefore set forth may be made without departing from the spirit and scope thereof, and therefore only such limitations should be imposed as are indicated in the appended claims.

What we claim as our invention is:

1. A device for use on an open top container for preparing a beverage, in particular coffee, comprising a one-piece body (1) having a pair of flat diametrically opposite wings (2 and 3) for resting on the rim of the open top container, a hollow open end portion (4) positioned between said wings (2 and 3) and extending from one side of said wings (2 and 3) and an inwardly turned flange (5) at one of its open ends spaced a distance from said wings (2 and 3) sufficient to receive beverage forming material (8) for at least one container of the beverage and a continuous flange (12) extending normal to and from the opposite side of said wings (2 and 3) and concentric with but spaced from said hollow open end portion (4) providing a shoulder (11) therebetween, porous material (6) seated on and extending between flange (5) and a ring (10) having the same thickness as the width of shoulder (11) and seated on said shoulder (11) within flange (12).

2. A device for use on an open top container for preparing a beverage, in particular coffee, as claimed in claim 1 including a ring (7) seated on porous material (6) above flange (5) and a second porous material (9) seated on shoulder (11) beneath ring (10) and extending across said hollow open end portion (4).

3. A device for use on an open top container for preparing a beverage, in particular coffee, as claimed in claim 2 wherein said body (1) and rings (7 and 10) are of a synthetic material and porous material (6) is filter paper.

4. A device for use on an open top container for preparing a beverage, in particular coffee, as claimed in claim 1 wherein said porous material (6) is a bag (14) containing said beverage forming material (8).

5. A device for use on an open top container for preparing a beverage, in particular coffee, as claimed in claim 1 wherein said body (1) is of sheet aluminum.

6. A device for use on an open top container for preparing a beverage, in particular coffee, as claimed in claim 1 including a vacuum package of aluminum foil for said beverage forming material.

References Cited

UNITED STATES PATENTS

| | | | |
|---|---|---|---|
| 1,146,922 | 7/1915 | Childress | 99—306 |
| 1,804,278 | 5/1931 | Scherck | 99—304 X |
| 1,876,474 | 9/1932 | Starkey | 99—304 |
| 2,358,556 | 9/1944 | Block | 99—306 |
| 2,899,310 | 8/1959 | Dale | 99—306 |
| 2,936,695 | 5/1960 | Donot | 99—304 |
| 3,139,344 | 6/1964 | Weisman | 99—306 X |

FOREIGN PATENTS 568,547  12/1923  France.

ROBERT W. JENKINS, *Primary Examiner.*